Aug. 27, 1957 W. A. ELIOT 2,804,497

AUTOMATIC-GAIN-CONTROL SYSTEM FOR PHOTOELECTRIC ENGRAVING MACHINES

Filed Aug. 31, 1953

United States Patent Office 2,804,497

Patented Aug. 27, 1957

2,804,497

AUTOMATIC-GAIN-CONTROL SYSTEM FOR PHOTOELECTRIC ENGRAVING MACHINES

Warner A. Eliot, New Canaan, Conn., assignor to Fairchild Camera and Instrument Corporation, a corporation of Delaware Application August 31, 1953, Serial No. 377,536

5 Claims. (Cl. 178—7.1)

Figure 1:
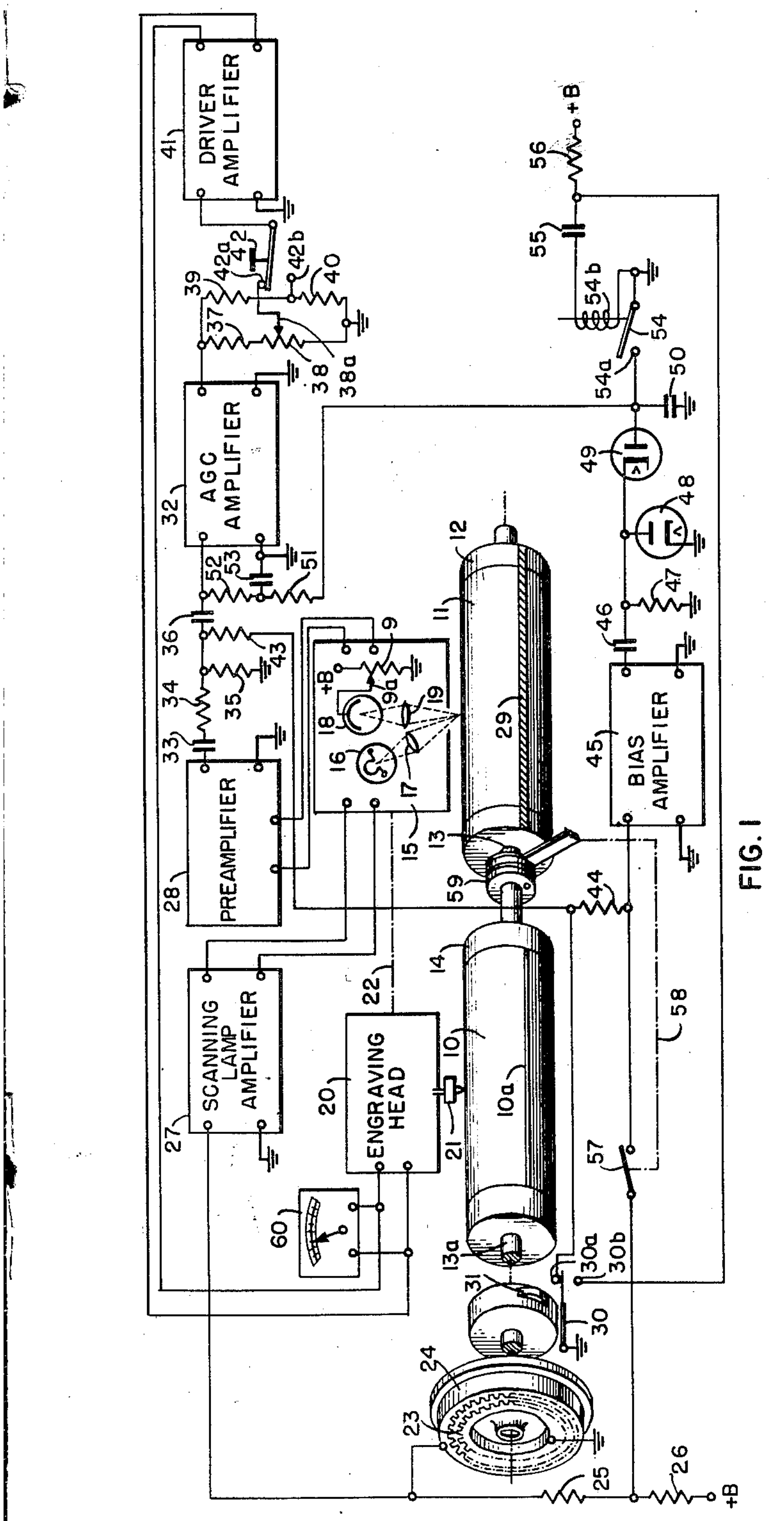

This invention relates to automatic-gain-control systems for photoelectric engraving machines and more particularly to such systems adapted automatically to control the gain of photoelectric engraving machines of the type disclosed and claimed in United States Letters Patent No. 2,575,546 to Boyajean.

The photoelectric engraving machine described in Patent 2,575,546, in general, comprises two synchronously movable supporting members, such as rotatable cylinders, on one of which is mounted an image sheet, such as a photographic print, and on the other of which is mounted a plate to be engraved, such as a sheet of cellulose nitrate. The image sheet is scanned by a photoelectric pickup system and the engraving plate is scanned synchronously therewith by an engraving head having a heated oscillating stylus responsive to the photoelectric pickup for forming a series of deformations on the plate, resulting in a half-tone engraving similar to that obtained by conventional photochemical processes.

In a photoelectric engraving machine of the type described it is, of course, desirable that the overall sensitivity of the system remain constant; that is, when a given shade level of the image sheet is being scanned, it is desirable that the engraving head effect a predetermined and related penetration of the engraving plate by the stylus. However, in use there are a number of factors which contribute to the overall sensitivity of the machine which tend to drift with time, among which the most serious appear to be the fatigue of the photoelectric pickup and the aging of the scanner light used to illuminate the image sheet. The present invention is directed to a system for substantially eliminating variations in the overall sensitivity of a photoelectric engraving machine due to all causes originating in the photoelectric pickup and amplifying system and normally occurring over a period of time.

It is an object of the invention, therefore, to provide a new and improved automatic-gain-control system for photoelectric engraving machines which overcomes the tendency of a given shade level of the engraved plate to drift with time.

It is another object of the invention to provide a new and improved automatic-gain-control system for photoelectric engraving machines which substantially eliminates variations in overall sensitivity of the machine due to all causes originating in the photoelectric pickup and amplifying system.

It is a particular object of the invention to provide a new and improved automatic-gain-control system for photoelectric engraving machines which substantially eliminates variations in overal sensitivity of the machine due to fatigue of the photoelectric pickup or aging of the scanner light or both.

In accordance with the invention, in a photoelectric engraving machine for producing on a plate from an image sheet a screened relief pattern suitable for image reproduction by printing processes and including photoelectric pickup means for periodically scanning an image sheet to develop an image signal, there is provided an automatic-gain-control system comprising a controllable-gain image-signal repeater and means for generating during a small fraction of the scanning period a periodic reference signal of an amplitude corresponding to a predetermined shade value of an image being scanned. The system also comprises circuit means for developing a unidirectional control potential representative of the amplitude of the reference signal, an energy-storage element connected to the circuit means to be charged by the control potential and having a leakage path of substantially infinite resistance, and a circuit for applying the potential across the storage element to the repeater automatically to compensate for variations in sensitivity of the pickup means.

For a better understanding of the present invention, together with other and further objects thereof, reference is had to the following description, taken in connection with the accompanying drawing, and its scope will be pointed out in the appended claims.

Figure 2:
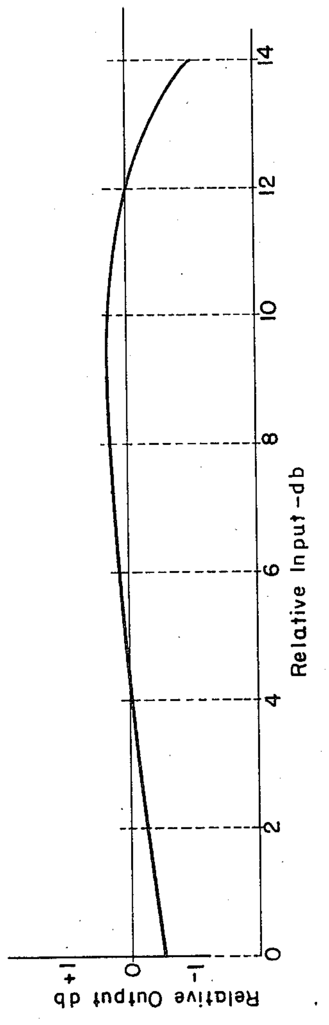

Referring now to the drawing:

Fig. 1 represents, partially schematically, a complete photoelectric engraving machine embodying the automatic-gain-control system of the invention; and Fig. 2 is a graph illustrating an operating characteristic of the automatic-gain-control system of Fig. 1.

Referring now more particularly to Fig. 1 of the drawing, there is represented a machine for producing on a plate 10 from an image sheet 11 a screened relief pattern suitable for image reproduction by printing processes. The machine includes an image-sheet supporting member, such as a cylinder 12, mounted on a shaft 13 and a plate supporting member or cylinder 14 mounted on a shaft 13*a* normally driving the shaft 13 through a clutch 59, so that the cylinders 12 and 14 are normally rotated synchronously by means of a motor (not shown) driving the shaft 13*a*. The machine also includes means for periodically scanning the image sheet to develop an image signal. This scanning means may be in the form of a head 15, including a scanning lamp 16 and an optical system, such as lens 17, for focusing the light from the lamp to a spot on the image sheet 11. The scanner 15 also includes a pickup photocell 18 on which the image of the illuminated spot is focused by an optical system, such as a lens 19. A potential-responsive electrode of the photocell 18 is connected to an adjustable contact 9*a* of a voltage-divider resistor 9 connected to a suitable source +B. If the photocell 18 is of the photomultiplier type, the contact 9*a* may be connected to its dynode electrode. Co-operating with the engraving plate 10 is an engraving head 20 including an oscillating heated stylus 21. The scanner 15 may be of the type represented by the scanning carriage 22 in aforesaid Patent No. 2,575,546, while the engraving head and stylus 21 may be in the form of the carriage 23 and stylus-actuating assembly 30 of said patent. As indicated by the dot-dash line 22, the scanner 15 and the engraving head 20 are driven to scan the image sheet 11 and the engraving plate 10, respectively, in synchronism.

On the shaft 13*a* is also mounted a rotor 23 of a screen-frequency generator having a stator 24, the elements 23 and 24 having oppositely disposed teeth of equal numbers so that, upon rotation, they essentially comprise a capacitor variable in value at a frequency depending upon the number of opposed teeth and relative speed of rotation of the elements. As described in aforesaid patent, the stator 24 may be rotated at a suitably low speed to provide a desired angularity in the screen pattern. The rotor 23 is grounded through the frame of the machine, as indicated schematically, while the stator is connected to a high-voltage source +B through a voltage divider comprising series-connected resistors 25 and 26. The scanner lamp 16 is energized with a current of screen frequency by applying a screen-frequency potential derived from the load resistor 25 to a scanning lamp amplifier 27 which supplies a screen-frequency current to the lamp 16. The output of the scanner unit 15 is applied to an image-signal repeater, represented as a pre-amplifier 28.

The machine of Fig. 1 also comprises means including the photoelectric pickup means or scanner 15 for generating, during a small fraction of the scanning period, a periodic reference signal of an amplitude corresponding to a predetermined shade level or tone of an image being scanned. This means may include an element, such as a strip 29 of reference shade value, disposed on the supporting cylinder 12 so that it is scanned by the unit 15 once during each revolution of the cylinder 12. The reference-signal generating means further includes means for sampling the image signal during the scanning of the reference element 29, which may be in the form of a two-position electric switch 30 operated synchronously with the scanning of the image sheet. Specifically, the switch element 30, which is grounded, normally engages a contact **30*a* but is operated by a cam 31 mounted on the shaft 13 and rotating synchronously with the cylinder 12 to engage its contact 30*b*. The connection of the switch 30** in the automatic-gain-control system is described hereinafter.

The image-signal output of the preamplifier 28 is applied to an automatic-gain-control (AGC) amplifier unit 32 through a filter network comprising a series condenser 33 and resistor 34, a shunt resistor 35, and a series coupling condenser 36. The signal output of the amplifier 32 is applied to a pair of parallel-connected voltage-divider circuits comprising series-connected resistors 37, 38 and 39, 40, respectively, the resistor 38 being provided with an adjustable tap **38*a*. The signal appearing at the adjustable tap 38*a* or at the junction of resistors 39 and 40 may be selectively applied to a driver amplifier 41 through a single-pole two-position pushbutton switch 42. The power output of the amplifier 41 is applied directly to the engraving head 20**, as illustrated.

A portion of the image-signal output of the preamplifier unit 28 is applied through series resistors 43 and 44 to the input circuit of a bias amplifier unit 45. Normally, this signal is shorted out by the grounding of the junction of resistors 43 and 44 through the switch element 30 and its contact **30*a***.

The automatic-gain-control system of the invention also includes circuit means for developing a unidirectional control potential representative of the amplitude of the reference signal. This circuit means includes the bias amplifier 45 which translates the reference signal, as described hereinafter, and rectifier means coupled to the output of the amplifier 45. The rectifier means is in the form of a voltage-doubling rectifier circuit comprising a series condenser 46, a load resistor 47, a shunt diode rectifier 48, a series diode rectifier 49, and an energy-storage element, such as a memory condenser 50, connected to the circuit means to be charged by the unidirectional control potential. The automatic-gain-control system also includes a circuit for applying the control potential across the condenser 50 to the automatic-gain-control amplifier or repeater 32 automatically to compensate for variations in the sensitivity of the photoelectric pickup and amplifying system. This circuit is by way of a filter including series resistors 51, 52 and shunt condenser 53 to the control circuit of the AGC amplifier 32.

The automatic-gain-control system of the invention further includes an electric switch 54 operated synchronously with the scanning of the image sheet for momentarily discharging the storage element or condenser 50 during the initial portion of each periodic reference signal. When the switch 54 engages its contact **54*a*, it is effective directly to short-circuit the condenser 50. The switch 54 is provided with an operating winding 54*b* connected in series with a condenser 55 which is connected to be charged through the winding 54*b* from a source of unidirectional potential +B through a current-limiting resistor 56. The condenser 55 is connected to be discharged through the winding 54*b* of switch 54 and the contact 30*b* of switch 30 when the latter is operated to engage such contact by the cam 31. The circuit constants are so selected that the sum of the charge and discharge time constants of the storage element or condenser 50 is substantially less than the period of the reference signal, that is, than the time required for the unit 15 to scan the element 29 of reference shade value. It has been determined that, by a proper selection of circuit values, the sum of the charging and discharging times of the condenser 50 may be made less than 0.1 second, which, in a machine having the specifications recited in said Patent 2,575,546, is approximately 5% of the period of rotation of the supporting cylinders 12, 14. Preferably the shorting period of condenser 50 corresponds to the initial one-fifth of the period of scanning the reference element 29. The cam 31 is designed to close switch 30 on its contact 30*b* momentarily to initiate shorting of condenser 50**, as described above.

The automatic-gain-control system of the invention also includes manually operable means for applying a standardizing signal to the circuit means including the bias amplifier 45 when initially adjusting the machine for a given reference shade value, for example, for white or black or both. This means may be in the form of a normally open switch 57 which, as indicated by the dot-dash line 58, is mechanically interconnected with the clutch 59 for disengaging the image-sheet supporting cylinder 12 during the initial setting up of the machine.

In explaining the operation of the above-described system, it will be assumed that initially an image sheet 11 to be reproduced is mounted on the cylinder 12 and a sheet 10 to be engraved is mounted on the cylinder 14. Initially, the machine is "standardized" to ensure a predetermined input to the engraving head 20 when a given shade level is scanned by the unit 15. During the standardizing process, the image drum 12 is stopped and the potential on the memory condenser will tend to leak off so that if the AGC system were operative, the overall gain of the system would tend to wander. Therefore, it is desirable to lock the AGC amplifier to a fixed, pre-set gain during standardization. To this end, clutch 59 is disengaged and standardizing switch 57 is closed through link 58 so that a portion of the screen-frequency signal from the generator 23, 24 is applied by way of voltage divider 25, 26 to the input circuit of bias amplifier 45. This screen-frequency signal is amplified in unit 45, rectified by the diodes 48, 49, and appears as a unidirectional control potential across the condenser 50. This potential is applied to the AGC amplifier 32 to "lock" its gain to a preselected value.

Switch 42 is then actuated to engage its contact **42*b* and contact 9*a* of voltage divider 9 is adjusted to develop a predetermined output, as indicated by meter 60, while the scanner unit 15 is in registry with the reference shade strip 29. Cylinder 12 is then rotated to bring a portion of the image sheet of reference shade level, for example, white, in registry with the scanner unit 15. Switch 42 is then released to engage its contact 42*a* and contact 38*a* of voltage divider 38 is adjusted to obtain the same output indication on meter 60. This then means that, for a reference shade value, such as white, the system is developing an image signal of appropriate amplitude to energize the engraving head 20 to produce a high-light screen pattern on the plate 10** corresponding to white.

The standardizing method just described is also useful for setting the overall gain of the system for a range of input signals beyond the range of the AGC system, as when replacing a scanning lamp 16 or photocell 18.

After the foregoing adjustments, and such other adjustments of the machine as may be appropriate, the clutch 59 is engaged, thereby opening the switch 57 and putting the machine into operation and the switch 42 is actuated to engage its contact 42a to permit manual adjustment of the system for any given shade value such as white. Under these conditions, an image signal is developed by the photocell pickup 18 and amplified in the preamplifier 28 which, from instant to instant, varies in amplitude in accordance with variations in the shade value of the successive elemental portions of the image sheet 11. This amplified image signal applied to the driver amplifier 41 and the engraving head 20 is effective to cause the heated stylus 21 to engrave the plate 10 in the form of a screen or half-tone pattern, as described in more detail in aforesaid Patent No. 2,575,546.

However, as described above, the luminosity of the scanner light 16 for a given energization tends to decrease with age. Also, the photosensitive response of the photocell 18 tends to decrease with age, though not necessarily at a comparable rate. Unless compensated for, these variations, as well as other sources of drift in the pickup and amplifying system, tend to result in variations in the image-signal output of the system so that it does not remain in accurate correspondence with variations in the illumination of the successive elemental areas of the image sheet 11. This tendency to drift is compensated by the automatic-gain-control system described above. Briefly, once during each revolution of the supporting cylinders 12, 14, the scanner unit 15 scans the element 29 of reference shade value and, therefore, develops in the output of the preamplifier 28 a reference signal dependent in amplitude upon such shade level. It is noted that this reference element 29 is in alignment with the junction 10a of the ends of the engraving plate 10 so that the reference signal occurs during what is effectively a margin of the image being engraved.

Simultaneously with the registration of the scanning spot of the scanner 15 on the leading edge of the reference element 29, the cam 31 operates the switch 30 to disengage its contact 30a, thereby removing the short-circuit from the input to bias amplifier 45 and applying thereto the reference signal from the preamplifier 28 through the resistors 43, 44. Promptly thereafter the cam 31 causes the switch 30 to engage its contact 30b, thereby grounding the condenser 55 which, with the winding 54*b*, comprises a short time-constant oscillatory circuit. The first oscillation of this circuit energizes the winding 54b to engage the switch 54 with its contact 54a, thereby momentarily short-circuiting the memory condenser 50 and removing any control potential previously stored thereon. As stated above, the switch 54 is closed for only approximately the first fifth of the scanning interval of the reference element 29. The current-limiting resistor 56 is of such a value as to prevent the recharging current of the condenser 55 from energizing the winding 54b to operate the switch 54.

As soon as the switch 54 opens, the reference signal is amplified in the unit 45 and is rectified and its voltage doubled by the elements 46, 47 and 48, 49 in a conventional manner to develop across the condenser 50 a unidirectional control potential of an amplitude substantially double that of the reference signal. This control potential is applied by way of the filter 51, 52, 53 to the input of the AGC amplifier 32 to control or regulate its amplification.

Shortly before the scanning spot of the scanner 15 leaves the trailing edge of the reference element 29 during the scanning cycle, the cam 31 causes the switch 30 to re-engage its contact 30a, thereby again removing the reference signal and the image signal from the bias amplifier 45. However, the condenser 50, under these circumstances, is substantially electrically isolated so that its leakage resistance is nearly infinity and it retains the unidirectional control potential developed thereacross during the scanning of the succeeding line of the image sheet 11.

It will be apparent from the foregoing description that if, for any reason, the response of the scanner 15 or the sensitivity of the scanning lamp amplifier 27 or preamplifier 28 should decrease during operation of the machine, the value of the reference signal developed during scanning of the reference element 29 would correspondingly decrease and the rectified reference signal developed across the condenser 50 would also correspondingly decrease. The decreased negative bias applied from the condenser 50 to the AGC amplifier 32 would, as well understood in the art, increase the amplification factor of that unit. If the grid bias-amplification factor characteristic of the unit 32 is approximately linear, the amplification of the unit will vary approximately inversely with the applied negative bias so that the output will remain substantially constant.

There is represented in Fig. 2 a graph of the overall input-output characteristic of an automatic-gain-control system in accordance with Fig. 1. From this graph it is seen that for a variation of input signals due to variations in the response of the scanner 15 and its associated amplifiers over a range of 14 db, the output signal varies over a range of only approximately ±½ db. Thus, by the use of the automatic-gain-control system of the invention in a photoelectric engraving machine of the type described in said Patent No. 2,575,546, the amplified image signal applied to the engraving head for any given shade value may be maintained substantially constant, compensating for level drift due to all causes originating in the scanner 15 and its associated amplifiers and particularly that due to aging of the scanner lamp 16 and fatigue of the photocell 18.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a photoelectric engraving machine for producing on a plate from an image sheet a screened relief pattern suitable for image reproduction by printing processes and including photoelectric pickup means for periodically scanning an image sheet to develop an image signal, an automatic-gain-control system comprising: a controllable-gain image-signal repeater; means for generating during a small fraction of the scanning period a periodic reference signal of an amplitude corresponding to a predetermined shade value of an image being scanned; circuit means for developing a unidirectional control potential representative of the amplitude of said reference signal; an energy-storage element connected to said circuit means to be charged by said control potential and having a leakage path of substantially infinite resistance; and a circuit for applying the potential across said storage element to said repeater automatically to compensate for variations in sensitivity of said pickup means.

2. In a photoelectric engraving machine for producing on a plate from an image sheet a screened relief pattern suitable for image reproduction by printing processes and including photoelectric pickup means for periodically scanning an image sheet to develop an image signal, an automatic-gain-control system comprising: a controllable-gain image-signal repeater; means for generating during a small fraction of the scanning period a periodic reference signal of an amplitude corresponding to a predetermined shade value of an image being scanned; circuit means for developing a unidirectional control potential representatie of the amplitude of said reference signal; an energy-storage element connected to said circuit means to be charged by said control potential and having a leakage path of substantially infinite resistance; an electric switch operated synchronously with the scanning of the image sheet for momentarily discharging said storage element during the initial portion of each periodic reference signal; and a circuit for applying the potential across said storage element to said repeater automatically to compensate for variations in sensitivity of said pickup means.

3. In a photoelectric engraving machine for producing on a plate from an image sheet a screened relief pattern suitable for image reproduction by printing processes and including photoelectric pickup means for periodically scanning an image sheet to develop an image signal, an automatic-gain-control system comprising: a controllable-gain image-signal repeater; means for generating during a small fraction of the scanning period a periodic reference signal of an amplitude corresponding to a predetermined shade value of an image being scanned; circuit means for developing a unidirectional control potential representative of the amplitude of said reference signal; an energy-storage element connected to said circuit means to be charged by said control potential and having a leakage path of substantially infinite resistance; an electric switch operated synchronously with the scanning of the image sheet for momentarily discharging said storage element during the initial portion of each periodic reference signal, the sum of the time constants of said charging and discharging circuits of said storage element being substantially less than the period of said reference signal; and a circuit for applying the potential across said storage element to said repeater automatically to compensate for variations in sensitivity of said pickup means.

4. In a photoelectric engraving machine for producing on a plate from an image sheet a screened relief pattern suitable for image reproduction by printing processes and including photoelectric pickup means for periodically scanning an image sheet to develop an image signal, an automatic-gain-control system comprising: a controllable-gain image-signal repeater; means for generating during a small fraction of the scanning period a periodic reference signal of an amplitude corresponding to a predetermined shade value of an image being scanned; circuit means for developing a unidirectional control potential representative of the amplitude of said reference signal; a circuit for applying said control potential to said repeater automatically to compensate for variations in sensitivity of said pickup means; and manually operable means for applying a standardizing signal to said circuit means when adjusting the machine for a reference shade level.

5. In a photoelectric engraving machine for producing on a plate from an image sheet a screened relief pattern suitable for image reproduction by printing processes and including photoelectric pickup means for periodically scanning an image sheet to develop an image signal, an automatic-gain-control system comprising: a controllable-gain image-signal repeater; means for generating during a small fraction of the scanning period a periodic reference signal of an amplitude corresponding to a predetermined shade value of an image being scanned; circuit means for developing a unidirectional control potential representative of the amplitude of said reference signal; an energy-storage element connected to said circuit means to be charged by said control potential and having a leakage path of substantially infinite risistance; means for momentarily discharging said storage element during the initial portion of each periodic reference signal including a relay having a widing and contacts connected to short-circuit said storage element, a condenser in series with said winding, a charging circuit for said condenser, and an electric switch operated synchronously with the scanning of the image sheet for short-circuiting said condenser through said winding, thereby developing an oscillatory discharge rapidly to actuate said relay to discharge said storage element; and a circuit for applying the potential across said storage element to said repeater automatically to compensate for variations in sensitivity of said pick-up means.

References Cited in the file of this patent

UNITED STATES PATENTS

| | | |
|---|---|---|
| 2,347,015 | Woloschak | Apr. 18, 1944 |
| 2,506,668 | Haynes | May 9, 1950 |
| 2,564,572 | Haynes | Aug. 14, 1951 |
| 2,570,665 | Gunderson | Oct. 9, 1951 |
| 2,615,089 | Rogers | Oct. 21, 1952 |
| 2,654,799 | Wendt | Oct. 6, 1953 |